(12) United States Patent
Honkawa et al.

(10) Patent No.: US 11,519,090 B2
(45) Date of Patent: Dec. 6, 2022

(54) METHOD AND APPARATUS FOR PRODUCING ELECTROLYTIC ALUMINUM FOIL

(71) Applicant: UACJ Corporation, Tokyo (JP)

(72) Inventors: Yukio Honkawa, Tokyo (JP); Junji Nunomura, Tokyo (JP); Yoichi Kojima, Tokyo (JP)

(73) Assignee: UACJ Corporation, Tokyo (JP)

( * ) Notice: Subject to any disclaimer, the term of this patent is extended or adjusted under 35 U.S.C. 154(b) by 233 days.

(21) Appl. No.: 16/438,324

(22) Filed: Jun. 11, 2019

(65) Prior Publication Data

US 2019/0292670 A1    Sep. 26, 2019

Related U.S. Application Data

(63) Continuation of application No. PCT/JP2017/044902, filed on Dec. 14, 2017.

(30) Foreign Application Priority Data

Dec. 16, 2016    (JP) .............................. JP2016-244562

(51) Int. Cl.
*C25C 3/06*    (2006.01)
*C25C 3/18*    (2006.01)
(Continued)

(52) U.S. Cl.
CPC ................. *C25C 3/18* (2013.01); *C25C 3/08* (2013.01); *C25C 3/12* (2013.01); *C25C 7/04* (2013.01);
(Continued)

(58) Field of Classification Search
CPC ................ C25C 3/06; C25C 3/00; C25D 1/04
See application file for complete search history.

(56) References Cited

U.S. PATENT DOCUMENTS

4,411,747 A * 10/1983 Dawless ................. C22B 21/06
205/377
2010/0297531 A1 * 11/2010 Liu .................... B01J 20/28033
429/498

(Continued)

FOREIGN PATENT DOCUMENTS

JP    S48-084043 A    11/1973
JP    S62-037387 A    2/1987
(Continued)

OTHER PUBLICATIONS

PCT, "International Preliminary Report on Patentability", Application No. PCT/JP2017/044902, dated Jun. 18, 2019, 9 pages.
(Continued)

*Primary Examiner* — Zulmariam Mendez
(74) *Attorney, Agent, or Firm* — Dorsey & Whitney LLP

(57) ABSTRACT

The method for producing an electrolytic aluminum foil of the present disclosure is a method for producing an electrolytic aluminum foil, the method including supplying an electrolytic solution in an electrolytic cell provided with a diaphragm between an anode and a cathode and depositing an aluminum foil on a surface of the cathode by electrolysis, wherein the diaphragm is made of aluminum having a purity of 85.0% or more and has a plurality of pores having an average pore diameter of 100 to 1000 μm.

10 Claims, 1 Drawing Sheet

(51) Int. Cl.
*C25C 3/12* (2006.01)
*C25C 7/04* (2006.01)
*C25D 1/04* (2006.01)
*C25C 3/08* (2006.01)
*C25D 3/66* (2006.01)
*C25D 1/00* (2006.01)

(52) U.S. Cl.
CPC ............... *C25D 1/00* (2013.01); *C25D 1/04* (2013.01); *C25D 3/66* (2013.01)

(56) References Cited

U.S. PATENT DOCUMENTS

| | | | | |
|---|---|---|---|---|
| 2014/0346050 | A1* | 11/2014 | Sakaida | C25D 3/665 |
| | | | | 205/77 |
| 2015/0140360 | A1* | 5/2015 | Arthur | H01M 50/449 |
| | | | | 429/7 |
| 2016/0233514 | A1* | 8/2016 | Okamoto | H01G 11/70 |
| 2018/0080134 | A1* | 3/2018 | Honkawa | C25D 1/20 |

FOREIGN PATENT DOCUMENTS

| | | | | |
|---|---|---|---|---|
| JP | 6463005 | * | 3/1989 | ............ B01D 53/22 |
| JP | H04337097 A | | 11/1992 | |
| JP | 2004269950 A | | 9/2004 | |
| JP | 2016186105 A | | 10/2016 | |

OTHER PUBLICATIONS

PCT, "Written Opinion of the International Searching Authority", Application No. PCT/JP2017/044902, dated Jan. 23, 2018, 5 pages.
International Search Report and Written Opinion dated Jan. 23, 2018 for PCT Application No. PCT/JP2017/044902, 6 pages.
English translation of Notice of Reasons for Refusal for JP Application No. 2016-244562, dated Aug. 24, 2020.
English translation of Office Action for JP Application No. 2016-244562, dated Mar. 1, 2021.

* cited by examiner

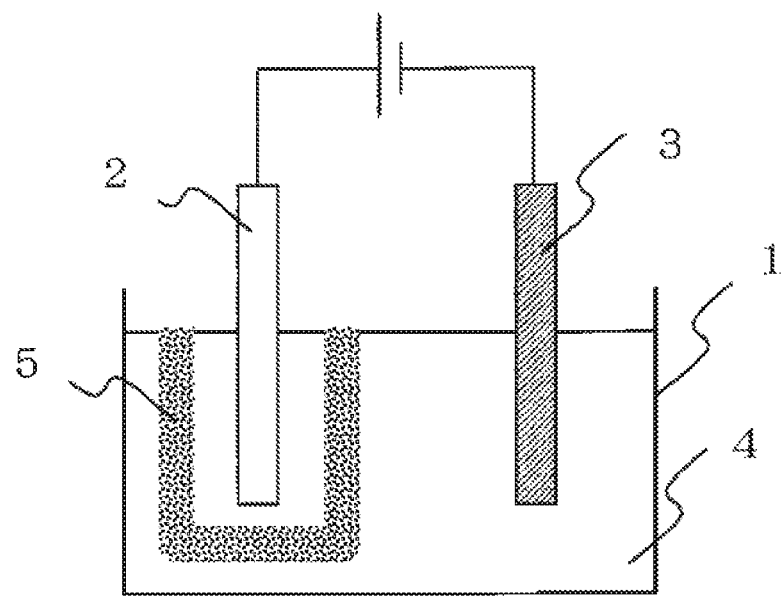

METHOD AND APPARATUS FOR PRODUCING ELECTROLYTIC ALUMINUM FOIL

CROSS REFERENCE TO RELATED APPLICATIONS

The present application is a continuation application of International Patent Application No. PCT/JP2017/044902 filed on Dec. 14, 2017, which claims priority to Japanese Patent Application No. 2016-244562, filed on Dec. 16, 2016. The contents of these applications are incorporated herein by reference in their entirety.

BACKGROUND

Technical Field

The present disclosure relates to a method and an apparatus for producing an electrolytic aluminum foil with which a high-quality electrolytic aluminum foil can be efficiently obtained.

Background Art

In recent years, lithium ion batteries have been utilized as batteries for automobiles and personal computers, and the positive electrode current collectors thereof are generally aluminum foils.

A conventional aluminum foil is produced by rolling a foil base. As the thickness of an aluminum foil which can be used as a positive electrode current collector of a lithium ion battery, about 10 µm is the lower limit at the level of current rolling techniques. However, to increase the battery capacity of a lithium ion battery further and miniaturize the lithium ion battery, it is required to make an aluminum foil thinner and reduce the volume of a positive electrode current collector in the inner volume of the battery, and instead fill a larger amount of an active material. Specifically, an aluminum foil having a thickness of 5 to 10 µm is desired. In addition, it is desired that an aluminum foil have better mechanical properties than conventional aluminum foils as the thickness is made thinner. Even though such an aluminum foil can be produced by a rolling method, there has been a problem that the number of rolling steps needs to be increased and the production cost thereby becomes relatively expensive.

On the other hand, according to an electrolysis method, an aluminum foil having a thickness of 5 to 10 µm can be produced through a few steps. In producing a high-quality aluminum foil by the electrolysis method, establishment of a method for controlling the purity in an electrolytic bath is desired. In addition, to reduce the production cost, it is preferable to use an anode made of aluminum having a purity as low as possible. For example, in Japanese Patent Application Laid-Open No. 4-337097, a method for electroplating an aluminum or an aluminum alloy on a base substance metal, wherein the aluminum and a plating bath are brought into contact in a reaction tank separated from a plating tank is described. In addition, in Japanese Patent Application Laid-Open No. 2004-269950, there is described a method for producing an electrolytic copper foil, the method including treating an electrolytic solution with activated carbon and using the activated carbon-treated electrolytic solution.

However, the method of Japanese Patent Application Laid-Open No. 4-337097 adopts a method of trapping an impurity in the reaction tank after the impurity which has dissolved from the anode diffuses in the whole plating tank, and therefore there is a problem that part of the diffused impurity is mixed in depositing aluminum from the plating bath. In addition, according to the method of Japanese Patent Application Laid-Open No. 2004-269950, a component in the electrolytic solution can be adsorbed by activated carbon, but an impurity other than aluminum cannot be adsorbed and removed selectively, and therefore the method of Japanese Patent Application Laid-Open No. 2004-269950 is not effective in production of an electrolytic aluminum foil.

SUMMARY

Thus, the present disclosure has been completed in consideration of the circumstances, and the present disclosure provides a production method and a production apparatus with which an impurity which has dissolved from an anode can be effectively trapped and removed and a high-quality electrolytic aluminum foil can be efficiently obtained without using a high-purity (for example, 99.99% or more) aluminum anode.

Solution to Problem (1) A method for producing an electrolytic aluminum foil, the method comprising: supplying an electrolytic solution in an electrolytic cell provided with a diaphragm between an anode and a cathode; and depositing an aluminum foil on a surface of the cathode by electrolysis, wherein the diaphragm is made of aluminum having a purity of 85.0% or more and has a plurality of pores having an average pore diameter of 100 to 1000 µm.

(2) The method for producing an electrolytic aluminum foil according to (1), wherein the diaphragm is made of aluminum having a purity of 85.0% to 99.90%.

(3) The method for producing an electrolytic aluminum foil according to (1), wherein the diaphragm is prepared by mixing and sintering an aluminum powder and a substance for forming pores and thereafter removing the substance for forming pores.

(4) The method for producing an electrolytic aluminum foil according to (1), wherein the electrolytic solution is a molten salt containing: an alkylimidazolium halide or an alkylpyridinium halide and an aluminum halide.

(5) The method for producing an electrolytic aluminum foil according to (1), wherein the electrolytic solution is a molten salt containing: an alkylimidazolium chloride or an alkylpyridinium chloride and aluminum chloride.

(6) The method for producing an electrolytic aluminum foil according to (1), wherein the cathode is made of titanium; and the anode is made of aluminum having a purity of 95.0 to 99.9%.

(7) An apparatus for producing an electrolytic aluminum foil, the apparatus comprising: an electrolytic cell in which an electrolytic solution is supplied; an anode and a cathode each to be immersed in the electrolytic solution; and a diaphragm provided between the anode and the cathode, and depositing an aluminum foil on a surface of the cathode by electrolysis, wherein the diaphragm is made of aluminum having a purity of 85.0% or more and has a plurality of pores having an average pore diameter of 100 to 1000 µm.

According to the present disclosure, an impurity which has dissolved from an anode can be effectively trapped and removed and a high-quality electrolytic aluminum foil can be efficiently obtained without using a high-purity (for example, 99.99% or more) aluminum anode.

BRIEF DESCRIPTION OF DRAWING

FIG. 1 is a diagram illustrating one example of an apparatus for producing an electrolytic aluminum foil of the present disclosure.

DESCRIPTION OF EMBODIMENTS

An electrolytic aluminum foil according to the present disclosure is produced by supplying an electrolytic solution in an electrolytic cell provided with a diaphragm between an anode and a cathode and depositing an aluminum foil on a surface of the cathode by electrolysis. In addition, an apparatus for producing an electrolytic aluminum foil according to the present disclosure is a production apparatus including: an electrolytic cell in which an electrolytic solution is supplied; an anode and a cathode each to be immersed in the electrolytic solution; and a diaphragm provided between the anode and the cathode, and depositing an aluminum foil on a surface of the cathode by electrolysis.

FIG. 1 illustrates one example of the apparatus for producing an electrolytic aluminum foil of the present disclosure. In an electrolytic cell 1, an anode 2 and a cathode 3 are arranged, and an electrolytic solution 4 is supplied. A diaphragm 5 is arranged around the anode 2. Hereinafter, each component in the apparatus for producing an electrolytic aluminum foil and electrolysis conditions in the method for producing an electrolytic aluminum foil will be described in detail.

(Electrolytic Solution)

Aluminum has a standard electrode potential of −1.662 V vs. SHE (Standard Hydrogen Electrode). Therefore, it is usually impossible to electrolytically deposit aluminum from an aqueous solution. As an electrolytic solution to electrolytically deposit aluminum, a molten salt being a mixture with an aluminum salt, or an organic solvent containing an aluminum salt dissolved is used.

The molten salt is broadly classified into an inorganic molten salt and an organic room-temperature type molten salt. In the present disclosure, it is preferable to use as the organic room-temperature type molten salt a molten salt containing an alkylimidazolium halide or an alkylpyridinium halide and an aluminum halide. The alkylimidazolium halide is, for example, an alkylimidazolium chloride and includes 1-ethyl-3-methylimidazolium chloride (hereinafter, written as "EMIC") specifically. In addition, the alkylpyridinium halide is, for example, an alkylpyridinium chloride and includes 1-butylpyridinium chloride (hereinafter, written as "BPC") specifically. In addition, the aluminum halide includes aluminum chloride (hereinafter, written as "$AlCl_3$") specifically. The melting point of a mixture of EMIC and $AlCl_3$ falls to around −50° C. depending on the composition thereof. Therefore, the electrodeposition of aluminum can be performed in an environment at a lower temperature. The combination of EMIC and $AlCl_3$ is the most preferable from the viewpoint of viscosity and electric conductivity of the electrolytic solution. It is preferable to set both the molar ratio of EMIC to $AlCl_3$ (EMIC:$AlCl_3$) and the molar ratio of BPC to $AlCl_3$ (BPC:$AlCl_3$) to 2:1 to 1:2, and both the ratios are more preferably set to 1:1 to 1:2.

An additive can appropriately be added to the molten salt. Examples of the additive include benzene, toluene, xylene, and 1-10 phenanthroline.

(Electrolysis Conditions)

In the present disclosure, it is preferable that the temperature of the electrolytic solution be within a range of 10 to 120° C. The temperature of the electrolytic solution is more preferably within a range of 25° C. to 100° C. When the temperature of the electrolytic solution is less than 10° C., the viscosity and resistance of the electrolytic solution increase, and therefore the maximum electric current density becomes small. As a result, the efficiency of electrodeposition is lowered, and the deposition of an aluminum film is liable to become ununiform. On the other hand, when the temperature of the electrolytic solution exceeds 120° C., the composition of the electrolytic solution becomes unstable due to volatilization and decomposition of a compound which forms the electrolytic solution. Particularly in the case where a molten salt containing EMIC and $AlCl_3$ is used as the electrolytic solution, the volatilization of $AlCl_3$ and the decomposition of 1-ethyl-3-methylimidazolium cation become remarkable. Further, energy for retaining the temperature of the electrolytic solution is large and deterioration of an electrolytic cell is accelerated, and therefore production efficiency is lowered.

In the present disclosure, it is preferable that the electric current density be 10 to 400 mA/$cm^2$. The electric current density is more preferably 20 to 200 mA/$cm^2$. An electrodeposition rate corresponds to an electric current density, and therefore when the electric current density is less than 10 mA/$cm^2$, lowering of production efficiency is brought about. In addition, when the electric current density is less than 10 mA/$cm^2$, the size of a crystal grain of aluminum deposited is large to make it difficult to form aluminum into the form of a film. As a result, peeling from the surface of the cathode becomes difficult. On the other hand, when the electric current density exceeds 400 mA/$cm^2$, the thickness of an aluminum film is liable to become ununiform.

(Anode and Cathode)

In the present disclosure, the anode contains aluminum. It is preferable that the purity of aluminum to be used for the anode be 95.0 to 99.9%. In the present disclosure, the diaphragm is provided between the anode and the cathode, and therefore an impurity dissolved from the anode can be effectively trapped and removed and a high-quality electrolytic aluminum foil can be efficiently obtained without using a high-purity (for example, 99.99% or more) aluminum anode.

As the cathode, titanium, stainless steel, nickel, carbon, and the like are used. Metals such as titanium, stainless steel, and nickel have a dense, natural oxide film formed on the surface thereof and therefore are excellent in corrosion resistance. In addition, the adhesiveness with the aluminum film is lowered due to the existence of the natural oxide film, and therefore the metals are suitable as the cathode. In addition, a non-metal material such as carbon has a low bonding power with the aluminum film and therefore is suitable as the cathode.

The shapes of the anode and the cathode are not particularly limited, and the anode in the form of a plate and the cathode in the form of a plate may be used, but it is preferable to use the cathode in the form of a drum in order to produce the aluminum foil continuously. The aluminum foil can be continuously collected by supplying the electrolytic solution between the anode and a cathode drum provided so as to face the anode, applying a direct current between both electrodes while rotating the cathode drum at a constant rate, and thereby depositing the aluminum foil on the surface of the cathode drum; peeling the deposited aluminum foil from the surface of the cathode drum; and winding the peeled aluminum foil onto a collection drum.

(Diaphragm)

In the present disclosure, the diaphragm is provided between the anode and the cathode. The diaphragm is made of aluminum having a purity of 85.0% or more. A metal component which forms the diaphragm and is other than aluminum includes Fe, Cu, Mg, Mn, and the like. These metal components may be used singly, or two or more of these metal components may be used in combination. When the purity of aluminum in the diaphragm is less than 85.0%, the content of the impurity becomes too large and there is a concern over dissolution to an electrolytic bath. When the purity of aluminum is 85.0% or more, a noble metal (for example, Fe, Mn, and Cu) is trapped and a high-quality aluminum foil not containing an impurity can be obtained, and therefore the upper limit of the purity is not particularly limited. However, when the purity of aluminum exceeds 99.9%, the price becomes too high, and such aluminum is not suitable from the viewpoint of production cost, and therefore 85.0 to 99.9% is most preferable.

The diaphragm has a plurality of pores having an average pore diameter of 100 to 1000 μm. The average pore diameter is preferably 200 to 800 μm. When the average pore diameter is less than 100 μm, transfer of ions is inhibited and the liquid resistance rises. As a result, the electrodeposition cannot be performed in some cases. On the other hand, when the average pore diameter exceeds 1000 μm, a noble metal which dissolves from the anode cannot be trapped. It is to be noted that the average pore diameter was obtained by selecting arbitrarily 50 pores each formed on a surface facing an electrode in the diaphragm and measuring the diameters of the respective pores to calculate an average value.

The diaphragm can be produced, for example, by mixing and sintering an aluminum powder and a substance for forming pores, and thereafter removing the substance for forming pores. The aluminum powder is made of aluminum or an aluminum alloy having a purity of 85.0% or more. The aluminum powder having a desired purity is obtained by mixing powder of a metal other than aluminum with a pure aluminum powder. In addition, those obtained by pulverizing a generally available aluminum alloy in the form of a plate into the form of powder may be used as the aluminum powder. The particle diameter of the aluminum powder is, for example, within a range of 1 to 3 μm.

Examples of the substance for forming pores include sodium chloride and a potassium chloride. The substance for forming pores is removed finally, and pores are thereby formed. That is, the pore diameter of the diaphragm can be controlled by the particle diameter of the substance for forming pores to be used. Accordingly, it is preferable that the average particle diameter of the substance for forming pores be 100 to 1000 μm.

The volume proportion of the aluminum powder based on the total volume of the aluminum powder and the substance for forming pores is preferably 10 to 20%. In the porosity, the blend ratio of the aluminum powder and the substance for forming pores is reflected. It is preferable that the porosity of the diaphragm be 80 to 90%. When the porosity is less than 80%, the proportion of communication pores decreases, and permeability of a liquid deteriorates. On the other hand, when the porosity exceeds 90%, aluminum retaining the shape decreases, and therefore the strength deteriorates. It is to be noted that the porosity is a calculated value based on the weight and volume of the diaphragm and the density of aluminum.

A molded body can be obtained by mixing the aluminum powder and the substance for forming pores and thereafter press-molding a resultant mixture. The press-molding is performed at a pressure of, for example, 200 to 300 MPa. Thereafter, the molded body is sintered, for example, in such a way that the temperature is raised from room temperature to 665° C. over 1 hour in vacuum of less than $10^{-2}$ Pa, and a sintering treatment is performed at a temperature of around 665° C. for 5 to 20 minutes. The substance for forming pores can be removed by immersion in water after the sintering.

The aluminum powder and the substance for forming pores may be held with a base material in the form of net. Examples of the base material in the form of net include a net made of stainless steel and a net made of Teflon (R). In the case of holding with the base material in the form of net, the porosity of the diaphragm is not particularly limited.

The diaphragm is arranged between the anode and the cathode. As illustrated in FIG. 1, it is preferable to arrange the diaphragm so as to surround the anode, but the diaphragm may be arranged so as to surround the cathode.

In the present disclosure, by providing the diaphragm between the anode and the cathode, a noble metal (for example, Fe, Mn, and Cu) which has dissolved from the anode can be trapped by the diaphragm. By trapping these metals, the purity of the electrolytic solution can be increased. As a result, a high-quality aluminum foil not containing an impurity can be obtained.

(Electrolytic Aluminum Foil)

The thickness of the electrolytic aluminum foil is usually 5 μm to 20 μm but may be appropriately selected according to the use thereof. For example, in the case where the electrolytic aluminum foil is used as a positive electrode current collector of a lithium ion battery, it is preferable to set the thickness to 10 μm or less.

It is preferable that the electrolytic aluminum foil according to the present disclosure be used for electricity storage devices such as a lithium ion secondary battery and a supercapacitor.

EXAMPLES

Hereinafter, preferred embodiments of the present disclosure will be specifically described based on Examples and Comparative Examples, but the present disclosure is not limited to these Examples.

(Preparation of Diaphragm)

Sodium chloride having a predetermined particle diameter and a predetermined aluminum powder were mixed and subjected to press molding. Thereafter, sintering was performed by a heat treatment to obtain a sintered body. The sintered body was immersed in pure water and sodium chloride being a substance for forming pores was dissolved and thereby removed. In the case of an aluminum alloy which was not available as the aluminum alloy in the form of powder, an aluminum alloy in the form of a plate was pulverized into the form of powder and thereafter mixed with the sodium chloride. The particle diameter of the sodium chloride corresponded to the pore diameter of the diaphragm. With respect to the prepared diaphragm, the composition of the aluminum alloy, the purity of aluminum, and the average pore diameter thereof are shown in Table 1. In the case of a JIS alloy, the number thereof is shown, and in other cases, the content of metals other than aluminum is shown.

(Preparation of Electrolytic Aluminum Foil)

A solution obtained by mixing EMIC and $AlCl_3$ in a molar ratio of EMIC:$AlCl_3$=1:2 was prepared as an electrolytic solution. The electrolytic solution was put into an electrolytic cell, and a titanium plate and an aluminum plate made of A3104 having a purity of about 95% were installed as a cathode and an anode, respectively, in the electrolytic solution. The diaphragm prepared was installed between the titanium plate and the aluminum plate. It is to be noted that the aluminum plate as the anode was arranged facing the titanium plate as the cathode so that the distance between the electrodes was 2 cm. The diaphragm was arranged so as to surround the anode at a position 1 cm apart from the aluminum plate as the anode. An electric current was applied at an electric current density of 40 mA/cm$^2$ until the film thickness reached 10 μm to deposit an aluminum foil on the surface of the cathode. After applying the electric current was completed, the deposited aluminum foil was peeled from the titanium plate, washed with acetone and pure water, and dried.

Whether the impurity existed or not was checked using an electron probe micro analyzer (EPMA) for the prepared aluminum foils. The results are shown in Table 1. In the case where the impurity was not detected, the judgment was "Good." In the case where the impurity was detected, the judgment was "Poor." It is to be noted that in Comparative Example 3, electrodeposition could not be performed, and therefore whether the impurity existed or not could not be evaluated.

Example 3, the average pore diameter of the diaphragm was as small as 80 μm, and therefore the liquid resistance was large and the applied voltage became high, so that electrodeposition could not be performed. In Comparative Example 4, the diaphragm did not exist, and therefore mixing of a plurality of components contained in the anode into the aluminum foil was recognized.

From those described above, the method for producing an electrolytic aluminum foil according to the present disclosure is a method for producing an electrolytic aluminum foil, the method comprising supplying an electrolytic solution in an electrolytic cell in which a diaphragm is provided between an anode and a cathode, and depositing an aluminum foil on a surface of the cathode by electrolysis, wherein the diaphragm is made of aluminum having a purity of 85.0% or more and has a plurality of pores having an average pore diameter of 100 to 1000 μm, and a high-quality electrolytic aluminum foil not containing an impurity can be thereby efficiently produced without using a high-purity aluminum anode.

INDUSTRIAL APPLICABILITY

According to the present disclosure, a high-quality electrolytic aluminum foil not containing an impurity can be efficiently produced without using a high-purity aluminum anode.

TABLE 1

| | Anode JIS alloy number | Diaphragm JIS alloy number | Contained element (in the case of alloy other than JIS alloy) Type | Content (mass %) | Purity of Al (%) | Average pore diameter (μm) | Judgement Concentration (%) detected by EPMA | | | | Production | | Note |
|---|---|---|---|---|---|---|---|---|---|---|---|---|---|
| | | | | | | | Fe | Si | Cu | Mn | Quality | cost | |
| Example 1 | 3104 | A1050 | — | — | 99.5 | 105 | 0 | 0 | 0 | 0 | Good | Good | |
| Example 2 | | A1050 | — | — | 99.5 | 196 | 0 | 0 | 0 | 0 | Good | Good | |
| Example 3 | | A1050 | — | — | 99.5 | 508 | 0 | 0 | 0 | 0 | Good | Good | |
| Example 4 | | A1050 | — | — | 99.5 | 990 | 0 | 0 | 0 | 0 | Good | Good | |
| Example 5 | | A1100 | — | — | 99.0 | 508 | 0 | 0 | 0 | 0 | Good | Good | |
| Example 6 | | — | Fe | 2 | 98.0 | 508 | 0 | 0 | 0 | 0 | Good | Good | |
| Example 7 | | ADC12 | — | — | 85.5 | 508 | 0 | 0 | 0 | 0 | Good | Good | |
| Example 8 | | 1N90 | — | — | 99.9 | 508 | 0 | 0 | 0 | 0 | Good | Good | |
| Reference Example 1 | 3104 | 1N99 | — | — | 99.99 | 508 | 0 | 0 | 0 | 0 | Good | Poor | |
| Comparative Example 1 | 3104 | ADC12 | — | — | 84.0 | 508 | 0.3 | 0 | 0.1 | 0 | Poor | Good | |
| Comparative Example 2 | | A1050 | — | — | 99.5 | 1070 | 0.02 | 0 | 0 | 0 | Poor | Good | |
| Comparative Example 3 | | A1050 | — | — | 99.5 | 80 | — | — | — | — | Poor | Good | |
| Comparative Example 4 | — | — | — | — | — | — | 0.1 | 0 | 0.08 | 0.04 | Poor | — | Without diaphragm |

As shown in Table 1, the impurity was not detected in the aluminum foil in Examples 1 to 8.

On the other hand, in Reference Example 1, the impurity was not detected in the aluminum foil, but the purity of aluminum was as high as 99.99%, and therefore the production cost was high. In Comparative Example 1, the purity of aluminum in the diaphragm was as low as 84%, and therefore the impurity dissolved from the diaphragm and the impurity was detected in the aluminum foil. In Comparative Example 2, the average pore diameter of the diaphragm was as large as 1070 μm, and therefore the impurity which had dissolved from the anode was not able to be trapped and the impurity was detected in the aluminum foil. In Comparative

What is claimed is:

1. A method for producing an electrolytic aluminum foil, the method comprising:

supplying an electrolytic solution in an electrolytic cell provided with a diaphragm between an anode and a cathode, wherein the electrolytic solution is a molten salt containing an alkylimidazolium halide or an alkylpyridinium halide and an aluminum halide;

depositing an aluminum foil on a surface of the cathode by electrolysis, wherein the diaphragm is made of aluminum having a purity of 85.0% or more and less than 99.9% and has a plurality of pores having an average pore diameter of 100 to 1000 μm; and trapping an impurity, by at least one of the plurality of pores of the diaphragm.

2. The method for producing an electrolytic aluminum foil according to claim 1, wherein the diaphragm is prepared by mixing and sintering an aluminum powder and a substance for forming pores and thereafter removing the substance for forming pores.

3. The method for producing an electrolytic aluminum foil according to claim 1, wherein the electrolytic solution is a molten salt containing an alkylimidazolium chloride or an alkylpyridinium chloride and aluminum chloride.

4. The method for producing an electrolytic aluminum foil according to claim 1, wherein
the cathode is made of titanium; and
the anode is made of aluminum having a purity of 95.0 to 99.9%.

5. An apparatus for producing an electrolytic aluminum foil, comprising:
an electrolytic cell in which an electrolytic solution is supplied, wherein the electrolytic solution is a molten salt containing an alkylimidazolium halide or an alkylpyridinium halide and an aluminum halide;
an anode and a cathode each to be immersed in the electrolytic solution; and
a diaphragm provided between the anode and the cathode, and
the apparatus depositing an aluminum foil on a surface of the cathode by electrolysis,
wherein the diaphragm is made of aluminum having a purity of 85.0% or more and less than 99.9% and has a plurality of pores having an average pore diameter of 100 to 1000 μm, and wherein the plurality of pores of the diaphragm is configured to trap an impurity.

6. The method of claim 1, wherein the diaphragm has a porosity of 80 to 90%.

7. A method for producing an electrolytic aluminum foil, the method comprising:
supplying an electrolytic solution in an electrolytic cell provided with a diaphragm between an anode and a cathode;
depositing an aluminum foil on a surface of the cathode by electrolysis, wherein
the diaphragm is made of aluminum having a purity of 85.0% or more and has a plurality of pores having an average pore diameter of 100 to 1000 μm, wherein the diaphragm is prepared by mixing and sintering an aluminum powder and a substance for forming pores and thereafter removing the substance for forming pores; and
trapping an impurity; by at least one of the plurality of pores of the diaphragm, further comprising:
press-molding a mixture of the aluminum powder and the substance for forming pores at a pressure of 200 to 300 MPa.

8. The method of claim 7, wherein a temperature of the sintering is raised from room temperature to 665° C. over one hour in a vacuum of less than $10^{-2}$ Pa, and wherein the sintering is performed at a temperature of 665° C. for 5 to 20 minutes.

9. The method of claim 1, wherein the impurity comprises a noble metal dissolved from the anode.

10. The apparatus of claim 5, wherein the impurity comprises a noble metal dissolved from the anode.

* * * * *